United States Patent [19]

Reihl et al.

[11] Patent Number: 5,069,500
[45] Date of Patent: Dec. 3, 1991

[54] VENTILATION ROOF FOR VEHICLES

[75] Inventors: Peter Reihl, Munich; Arpad Fuerst, Germering; Bernhard Wingen, Feldkirchen; Alfred Schmid; Thomas Schreiter, both of Munich; Erich Haendler, Starnberg, all of Fed. Rep. of Germany

[73] Assignee: Webasto AG Fahrzeugtechnik, Fed. Rep. of Germany

[21] Appl. No.: 525,603

[22] Filed: May 21, 1990

[30] Foreign Application Priority Data

May 24, 1989 [DE] Fed. Rep. of Germany ....... 3916905
Sep. 14, 1989 [DE] Fed. Rep. of Germany ....... 3930755

[51] Int. Cl.⁵ .............................................. B60J 7/053
[52] U.S. Cl. .................................... 296/214; 296/222; 296/223; 296/224
[58] Field of Search .................. 296/214, 216, 222–224

[56] References Cited

U.S. PATENT DOCUMENTS

| | | | |
|---|---|---|---|
| 4,320,921 | 3/1982 | Schaetzler | 296/213 |
| 4,671,564 | 6/1987 | Sumida et al. | 296/214 |
| 4,911,497 | 3/1990 | Schreiter et al. | 296/222 |

FOREIGN PATENT DOCUMENTS

| | | | |
|---|---|---|---|
| 8119662 | 7/1981 | Fed. Rep. of Germany . | |
| 3149977 | 6/1983 | Fed. Rep. of Germany . | |
| 0226325 | 10/1986 | Japan | 296/214 |
| 0028722 | 2/1988 | Japan | 296/214 |

Primary Examiner—Dennis H. Pedder
Attorney, Agent, or Firm—Sixbey, Friedman, Leedom & Ferguson

[57] ABSTRACT

Ventilation roof for vehicles with a roof opening made in a roof skin, a roof opening that can be closed by a cover that is connected to an adjustment mechanism having front and rear height adjustment devices. The cover can be swung by the front height adjustment devices, starting from a closed position, around a pivot axis, lying near its rear edge, into a ventilation position in which the cover front edge lies below the height of roof skin, while the cover rear edge is kept at approximately the height of the roof skin. The rear of the cover can be lowered below the roof skin by the rear height adjustment devices, and the lowered cover can be slid rearward underneath the roof skin into an open position. The front height adjustment devices each have a positively adjustable pivoted lever that is rotatable about an axis that is fixed relative to the roof and with which the cover is detachably coupled only when it is shifted fully forward.

24 Claims, 8 Drawing Sheets

VENTILATION ROOF FOR VEHICLES

BACKGROUND OF THE INVENTION

The invention relates to a ventilation roof with a roof opening made in a stationary roof skin, the roof opening being closable by a cover that is actively connected on both sides to an adjustment mechanism that has front and rear height adjustment devices. In particular, where the cover can be swung by the front height adjustment devices, from the closed position, around a pivot axis lying at or near its rear edge, into a ventilation position in which the cover front edge lies at a distance below the roof plane while the cover rear edge is kept at least approximately at the height of the stationary roof skin; and where the cover can be lowered by the rear height adjustment devices, so that its rear edge is below the stationary roof skin, and the lowered cover can be slid rearward at least approximately parallel to the stationary roof skin into an open position in which the cover at least partially opens the roof opening.

In allowed, commonly assigned, U.S. Patent Application Ser. No. 320,549, filed Mar. 8, 1989, now U.S. Pat. No. 4,911,497, by two of the present inventors and another, a ventilation roof of this type is described in which the adjustment mechanism on each side of the roof has a lengthwise extending connecting member that has a length that corresponds approximately to the length of the cover and that is guided to slide along a longitudinal guide mechanism that is integral with the roof and that is connected to the cover by at least a front and a rear cover connecting bolt. Here, the cover connecting bolts engage in connecting member tracks of the associated connecting member. In this way, the front and rear height adjustment devices are constantly engaged with the cover in all cover positions.

In a previously known ventilation roof (German Gebrauchsmuster 81 19 662), a cover that can pivot and alternately be removed but cannot slide in the lengthwise direction of the roof is provided with supporting levers that are linked to the underside of the cover to adjust the height of the cover front edge. These levers can, alternatively, be pushed up or pulled down by a handle.

Further, a ventilation roof is known (German Offenlegungsschrift 31 49 977) in which a second cover is placed in front of a cover that can be pivoted into a ventilation position (i.e., a position with a front edge of the cover lowered below the roof plane). Here, the front end of lateral guide rods is guided to pivot on a bearing support which is integral with the roof and attached in front of the front edge of the roof opening and to slide in the lengthwise direction, while the rear end of the guide rod is linked to the front end of the rear cover. On the front end of the front cover there is attached a guide plate that can be slid along the guide rods. If the front edge of the rear cover is lowered by hand, by the connection of the guide rods with the guide plate of the front cover, the front cover is also brought into a sloping position in which it can be pushed above the rear cover to open a front part of the roof opening.

SUMMARY OF THE INVENTION

The invention has a primary object of providing a ventilation roof of the type mentioned above which, for the purpose of head room, makes possible an especially flat type of construction with a relatively simple, sturdy and reliable adjustment mechanism.

In a ventilation roof for vehicles with a roof opening made in a stationary roof skin that can be closed by a cover that is actively connected on both sides to an adjustment mechanism having front and rear height adjustment devices, the cover being swingable by the front height adjustment devices, starting from the closed position, around a pivot axis lying at or near its rear edge, into a ventilation position in which the cover front edge lies at a distance underneath the roof plane while the cover rear edge is kept at least approximately at the height of the stationary roof skin, and where the rear edge of the cover can then be lowered, so that the lowered cover can be slid to the rear by a drive along longitudinal guide mechanisms that are integral with the roof, at least approximately parallel to the stationary roof skin, underneath the roof skin into an open position in which the cover at least partially opens the roof opening, this object is achieved, according to the invention, in that the front height adjustment devices each have a positively adjustable pivot lever that is supported, in the area of its front end, for rotation around an axis that is stationary, runs crosswise to the cover sliding direction, and is approximately horizontal, and at which the cover is detachably coupled only in a forwardmost cover position for the purpose of adjusting the height of the cover front edge.

In the ventilation roof according to the invention, an accompanying movement of the front height adjustment devices during sliding of the cover is avoided. The front height adjustment devices have an extremely simple construction and, in the vertical direction decisive for head room, they take up especially little space.

Preferably, guide elements integral with the cover and placed at or near the front and rear edge of the cover are guided to be adjustable in height between a position lying above the lengthwise guide mechanisms and a lowered position aligned with the lengthwise guide mechanisms in the vertical direction and to be slid in the lowered position along the lengthwise guide mechanisms. In this way, in a simple way a reliable, stable and vibration-proof guiding of the cover during its sliding movements is guaranteed.

The pivot lever can suitably exhibit, for detachable coupling with the cover, a guide track that is open to the rear and in which a glide element integral with the cover engages when the cover is in the front final position. Here, in another configuration of the invention, the arrangement is made so that, when the cover front edge is lowered, the pivot lever assumes a position in which the open end of the guide track of the pivoted lever is aligned with a glide track of the lengthwise guide mechanism integral with the roof for a passage of the glide element from the guide track into the glide track. This makes it possible for the glide element to pass directly from the pivot lever guide track into the glide track of the lengthwise guide mechanism and vice versa. Thus, the cover is always guided, in its front area, by the glide elements that are connected to the cover, both during decoupling from, and coupling with, the front height adjustment devices.

To adjust the pivot levers positively, suitably there are provided actuation elements that are in constant connection with the drive. Further, support elements to brace the pivot lever in the pivoted position corresponding to the closed cover position can be advantageously connected to the drive By these support elements, the cover in its closed position is kept in its front area in reliable sealing engagement with the stationary roof surface.

According to another configuration of the invention, a locking device is provided that locks the cover pivoting axis lying at or near the rear edge of the cover, in the closed cover position, and during pivoting movements of the cover between the closed position and the ventilation position, against a lengthwise sliding with respect to the stationary roof skin. In this way, undesired shifts of the rear cover pivoting axis are prevented.

The rear height adjustment devices can each exhibit, in a simple way, a push-out lever which, on the one hand, is linked to the cover or to a part integral with the cover and, on the other hand, to a glide part that is guided to slide along the associated lengthwise guide mechanism. Here preferably care is taken that the push-out lever assumes an at least approximately vertical position as long as the cover is in its front final position. In this way the cover is held especially reliably in the rear.

The overall design is further simplified with great stability if the push-out lever is connected to the cover or to the part integral with the cover by a connecting bolt that, simultaneously, forms the guide element which is integral with the cover, lies near the cover rear edge and which, when the cover rear edge is lowered, engages in the lengthwise guide mechanism during cover sliding movements.

In another configuration of the invention, a detachable coupling is provided for automatic coupling of the drive with the glide part linked to the push-out lever to swing the push-out lever and slide the cover, and suitably the locking device and the detachable coupling interact with one another so that, when the coupling is engaged, the locking device is positively unlocked and, when the locking device is locked, the coupling is positively disengaged.

To increase the head room a further contribution is made if the adjustment mechanism and the lengthwise guide mechanisms integral with the roof are placed on both sides of the roof opening and of the cover underneath the stationary roof skin and if, when the cover is moved from the ventilation position into the open position, the cover front edge, before and/or during the cover sliding movement, is made to move in an upward-oriented movement to a height that lies between the height position of the cover front edge in the ventilation position and of the cover front edge in the closed position.

If a sliding inside roof lining is placed underneath the cover, according to the invention the former can be coupled by a catch device with the drive of the cover so that, when the cover is swung from the closed position into the ventilation position, the sliding inside roof lining, in its closed position, is automatically pushed back into a position in which a ventilation gap is opened in front of the sliding inside roof lining. If here a drive cable and components permanently drive connected to the drive cable belong to the drive of the cover, a structurally especially simple and sturdy solution is achieved in that the catch mechanism exhibits a catch that is attached to the cable or to components integrally connected to the cable. In particular, the catch can be connected to a part of the detachable coupling integral with the drive cable, a coupling that is used for the automatic coupling of the drive with the glide part that is linked to the push-out lever and that has the purpose of swinging the push-out lever and sliding the cover.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 9 is a sectional view taken along the line IX—IX of FIG. 5a;

DETAILED DESCRIPTION OF THE PREFERRED EMBODIMENTS

With reference to FIGS. 1 to 4, a single-cover ventilation-sliding roof illustrated, has a cover 12 with a peripheral, projecting, rigid drip molding 13. Further, cover 12 has a pair of peripheral seals 14, 15, an seal 14 being laid in drip molding 13 and an outer seal 15 being placed on an offset edge flange 16. These seals 14 and 15, optionally including drip molding 13, can also be assembled into a one-piece profiled molded part of a constant cross-sectional shape that extends around the cover.

Figure 1:
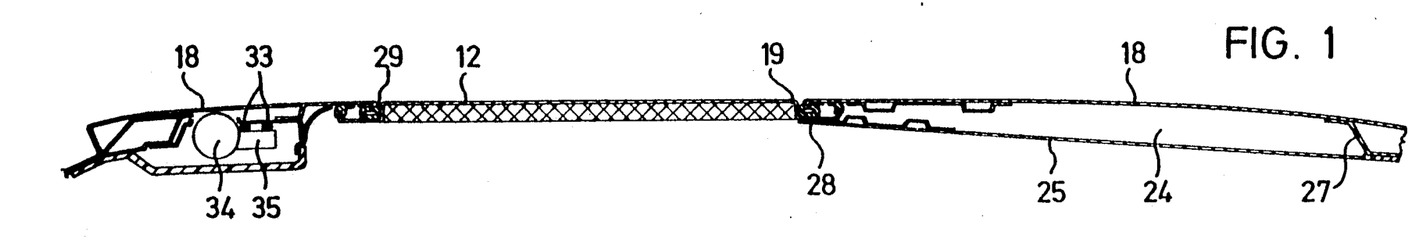
FIGS. 1 to 4 are lengthwise sections through the ventilation roof in various positions of the cover.
Figure 2:
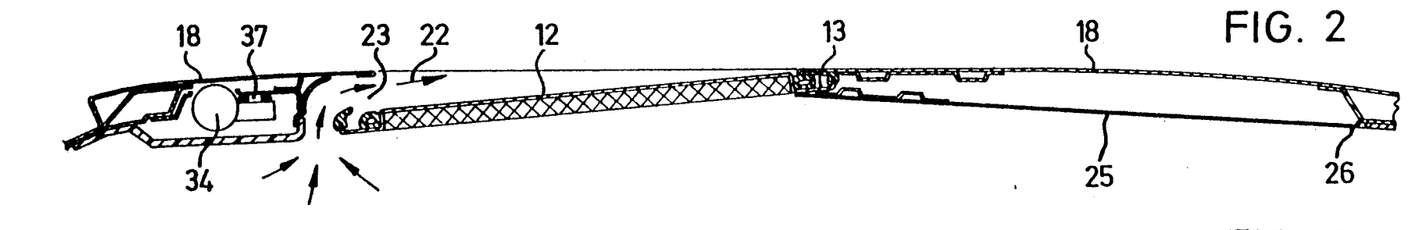

A roof opening 17 is formed in a stationary roof skin 18 and can be closed by cover 12. By an adjustment mechanism, explained further below, cover 12 can be pivoted, from the closed position of FIG. 1, around a pivot axis (imaginary) lying at or near its rear edge 19 into a ventilation position (FIG. 2) in which cover front edge 20 lies at a distance below the roof plane that is indicated at 21. In the ventilation position, cover rear edge 19 is kept at least approximately at the height of stationary roof skin 18. If, due to the motion of the vehicle, an underpressure arises on the outside of roof skin 18 relative to the pressure prevailing in the vehicle interior, an air stream is formed that is indicated in FIG. 2 at 22. The vehicle interior is, thus, ventilated by air being drawn through a gap 23 that is formed between cover front edge 20 and stationary roof skin 18.

Figure 3:
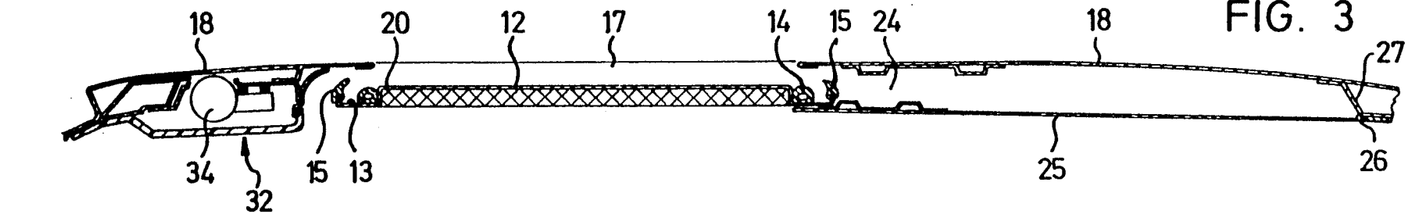
Figure 4:
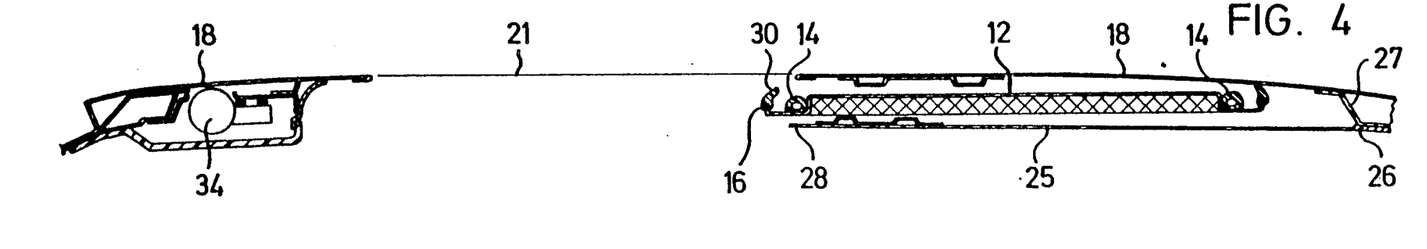

The roof opening 17, made in the front part of stationary roof skin 18, can be at least partially opened, if desired, by retracting cover 12, preferably, starting from the ventilation position according to FIG. 2. For this purpose, the rear edge 19 of cover 12 is lowered relative to underneath stationary roof skin 18 by an amount that is, preferably, smaller than the extent of cover front edge 20 in the ventilation position (FIG. 2). In this preferred course of operation, the cover front edge 20, which was previously lowered into the ventilation position, is simultaneously raised into an intermediate position between the ventilation position (FIG. 2) and the closed position (FIG. 1). In this way, cover 12 is brought into a sliding position in which it lies essentially parallel to roof skin 18 or roof plane 21 (FIG. 3). From the sliding position, cover 12 can be pushed rearward underneath roof skin 18 into an open position in which cover 12 at least partially opens roof opening 17 (FIG. 4).

In the open position, cover 12 is received in a space 24 between the part of roof skin 18 that is rearwardly adjacent to roof opening 17 and a stationary inside roof lining 25 lying under it. Stationary inside roof lining 25 can be swingably linked, in a way not represented in detail (e.g., corresponding to the arrangement according to the above-noted U.S. Patent Application Ser. No. 320,549), at 26 to a cross strut 27 which is integral with the roof so as to swing around a transverse axis and so as to be elastically prestressed upward with its front end 28 springing upward (FIGS. 1 and 2). When the rear edge 19 of cover 12 is lowered into the FIG. 3 sliding position, stationary inside roof lining 25 is pushed by cover 12 forward and downward, enabling the cover 12 to be pushed into space 24 (FIGS. 3 and 4).

As can be seen from FIG. 1, in the closed cover position, peripheral drip molding 13 of cover 12 is disposed underneath an edge gap 29 between the outer cover edge and the edge of roof opening 17. In doing so, seal 14 is pressed, from below, against roof skin 18 in the edge area of roof opening 17. Additionally, a flexibly yielding nose 30 of seal 15 lies against the underside of roof skin 18.

FIGS. 5 to 10 illustrate a modified cover 12' and seal design in which drip molding 13 is eliminated, and seals 14 and 15 are integrated into a single profiled seal 38. This seal 38 is placed on an edge flange 16' of cover 12', this edge flange being downwardly offset and projecting horizontally.

Figure 8:
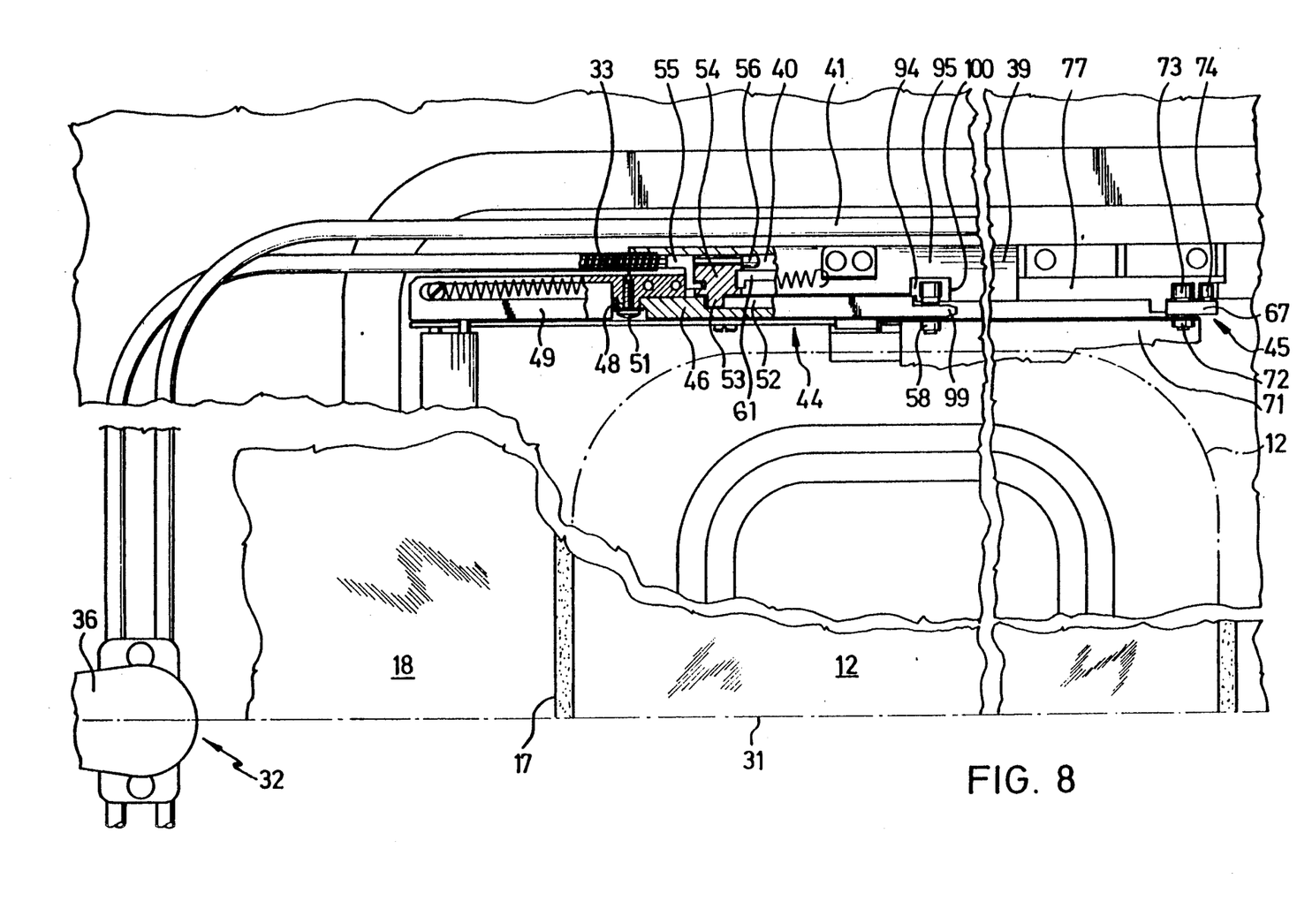
FIG. 8 is a partially broken-away top view of one side of the ventilation roof in the closed position corresponding to FIGS. 5a and 5b.
Figure 9:
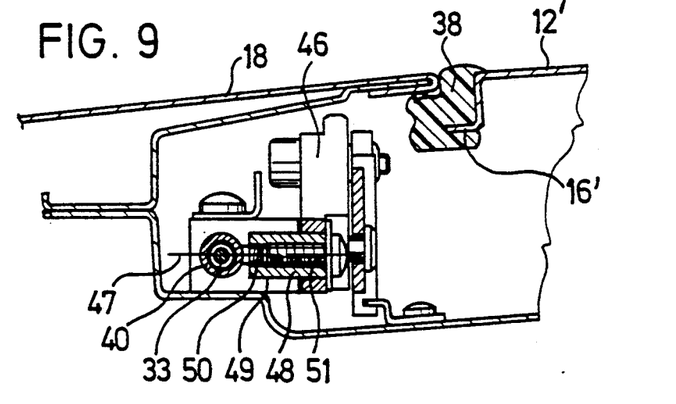
Figure 10:
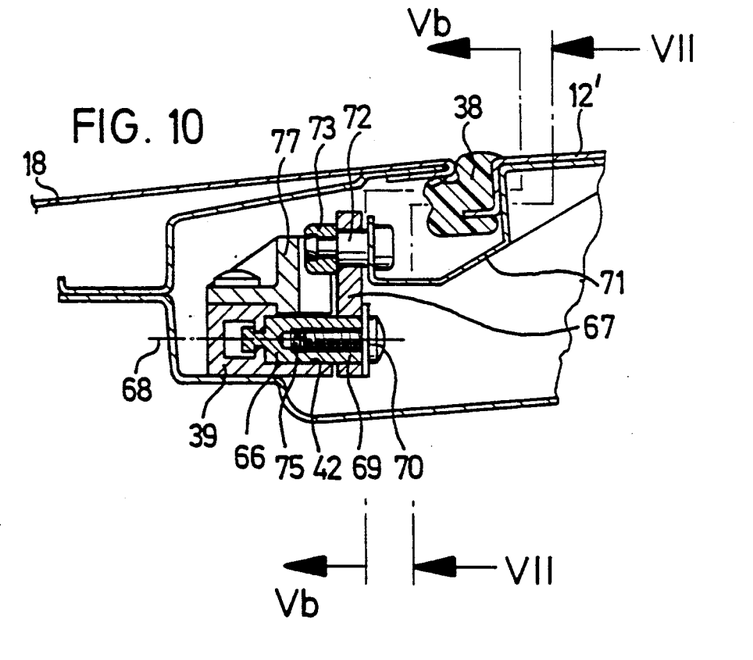
FIG. 10 is a sectional view taken along the line X—X of FIG. 5b.

The terms "front" and "rear" as used in this application refer to the forward travel direction of the motor vehicle in which the roof is installed. Further, the ventilation roof, including its adjustment mechanism, is made essentially in mirror-image symmetry with respect to a lengthwise central axis 31 (FIG. 8). Thus, explanation below refers to the right side of the roof as seen in the top view, but correspondingly applies also to the left side of the roof.

The adjustment movements are forced on cover 12 by a drive designated overall by 32. Drive 32 comprises two drive cables 33, for example, in the form of pressure-resistant threaded cables, that can be displaced in the longitudinal direction of the roof by a common drive mechanism. In FIGS. 1 to 4, a drive motor 34 with a downstream reduction gear 35 is indicated as the drive mechanism. FIG. 8 shows, as an alternative, a drive mechanism in the form of a crank handle 36. Drive mechanism 34 or 36 drives a pinion 37 that is in driving connection with both drive cables 33.

On both sides of roof opening 17, a longitudinal guide mechanism 39 extends which, for example, can be made as a guide rail that is fixedly mounted to the roof or is formed as a part of a roof frame. Each lengthwise guide mechanism 39 comprises a cable guide channel 40 for a drive cable 33 for the respective side of the roof, a cable guide channel 41 for the trailing end of the drive cable 33 allocated to the other side of the roof, and a slide track 42. The slide track 42 opens toward roof opening 17.

The adjustment mechanism used for the swinging and height adjustment of cover 12 has a front height adjustment device 44 and a rear height adjustment device 45, which can be actuated independently of one another, under the action of the longitudinal displacement of drive cables 33, which now will be described in detail reference to FIGS. 5a to 10.

The front height adjustment device 44 comprises a positively adjustable pivot lever 46. Pivoted lever 46 is rotationally supported in the area of its front end for movement about an axis 47 that is stationary, runs crosswise to the cover sliding direction, and is at least approximately horizontal. For this purpose, a cylindrical projection 48, of a link 49 that is fixed to a stationary part of the roof and that is adjacent to the front end of longitudinal guide mechanism 39, extends through an opening at the front end of pivot lever 46. Pivot lever 46 and link 49 are kept together by a screw 51 that is threaded into a tapped hole 50 of link 49. Pivot lever 46 is formed with a longitudinally extending link track 52 that rises rearwardly. An actuation element, in the form of a link journal 53, engages in link track 52. Link journal 53 is part of a catch 54 that is connected to drive cable 33 by an anti-torsion device 55 and a seal 56 and which moves along with the drive cable. Link track 52 merges, in the area of the rear end of pivot also made in the pivot lever and is open toward the rear.

Figure 5A:
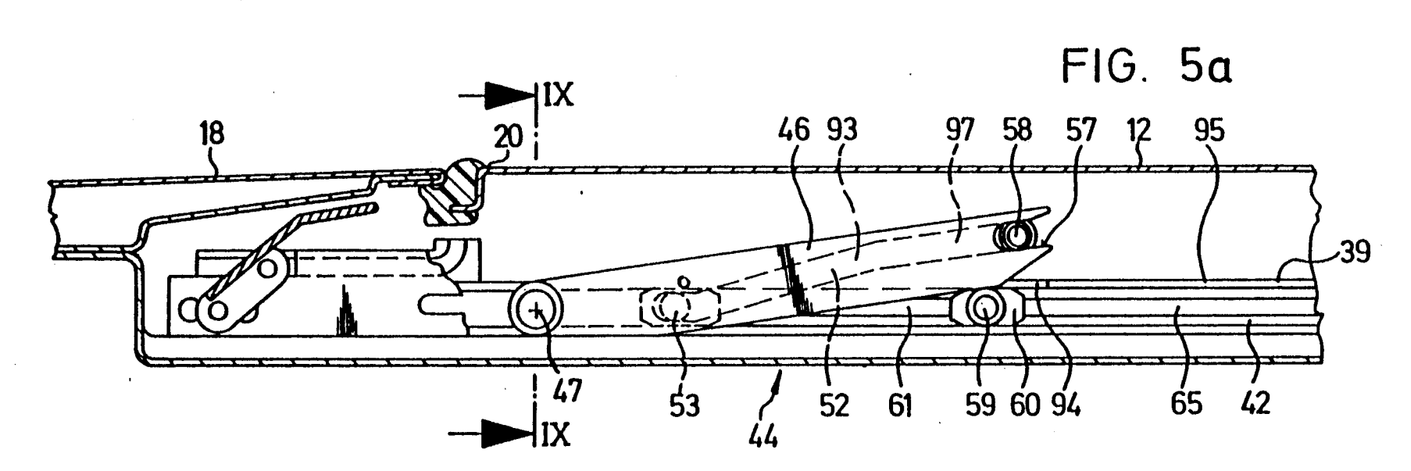
FIGS. 5a and 5b are lengthwise sectional views corresponding to front and rear edge areas, respectively, of the roof shown in FIG. 1 on an enlarged scale that shows the details of an adjustment mechanism, FIG. 5b being taken along the line Vb—Vb of FIG. 10.

Attached to cover 12 or to a part 71 that is fixed to the cover, for example a cover frame, there is a glide element 58 that lies in guide track 57 when cover 12 assumes its frontmost positions shown in FIGS. 1, 2 and 3, as illustrated in FIGS. 5a and 8. Guide track 57 and glide element 58, in this way, produce a detachable coupling between the front height adjustment device 44 and cover 12 This coupling is automatically engaged when cover 12 reaches its frontmost sliding position (FIG. 3) coming from a retracted position (FIG. 4). Vice versa, this coupling is automatically disengaged when cover 12 is shifted rearward out of its frontmost sliding position.

A cover support 60, carrying a bolt 59 is connected to catch 54 by a rod 61. A freely rotatable roller 62 is mounted on bolt 59. Roller 62 lies against the underside of pivot lever 46 when front height adjustment device 44 has raised the front of cover 12 into the closed position and pivot lever 46, consequently, assumes the upward-swung position illustrated in FIG. 5a.

Figure 5B:
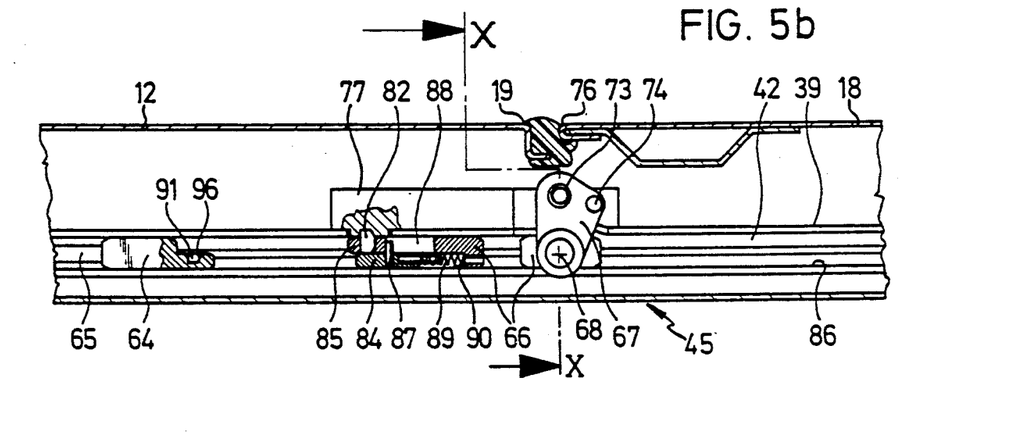

A unlocking part 64 is slidably guided in the lengthwise direction in glide track 42 of lengthwise guide mechanism 39 (FIG. 5b). Unlocking part 64 is rigidly connected by a rod 65 to cover support 60 and, thus, also to catch 54 and drive cable 33. Rearwardly of unlocking part 64, a glide part 66 is longitudinally slidably arranged in glide track 42. One end of glide part 66 is pivotally linked to the lower end (in the closed cover position) of a short push-out lever 67 of rear height adjustment device 45 for a swinging movement around a horizontal crosswise axis 68 (FIGS. 5b, 6b, 7b and 10). In the embodiment illustrated, a cylindrical attachment 69 of glide part 66 engages in a complementary bore of push-out lever 67, as can be seen especially from FIG. 10, and push-out lever 67 is secured against a downward slipping of glide part 66 by a screw 70 that engages in a tapped hole 75 of glide part 66.

Part 71 integral with the cover (FIG. 10) is connected to the top end (in the closed cover position) of push-out lever 67 by a joint bolt 72. A roller 73 is rotationally supported on the end of bolt 72 that projects outward from push-out lever 67 relative to roof opening 17. Push-out lever 67 carries another roller 74 that is arranged offset to the rear with respect to roller 73 in the closed cover position.

In the area of the rear edge 76 of roof opening 17, there is placed a link 77 that interacts with longitudinal guide mechanism 39 and is fixed to a stationary part of the roof. In the embodiment illustrated, link 77 is disposed longitudinal guide mechanism 39. However, instead, optionally, it can also be integrated into the longitudinal guide mechanism 39 as a one-piece part. Link 77 forms a cam track 78 that points downwardly and rearwardly, and also forms a link slot 79 which lies in front of the cam track 78. The link slot and cam track 78, 79 interact with roller 74 or roller 73 in a way explained further below. In a front part of link 77, a recess 80 is provided that opens downwardly into glide track 42, and which has rear wall 81 that slopes rearwardly downward.

Figure 6A:
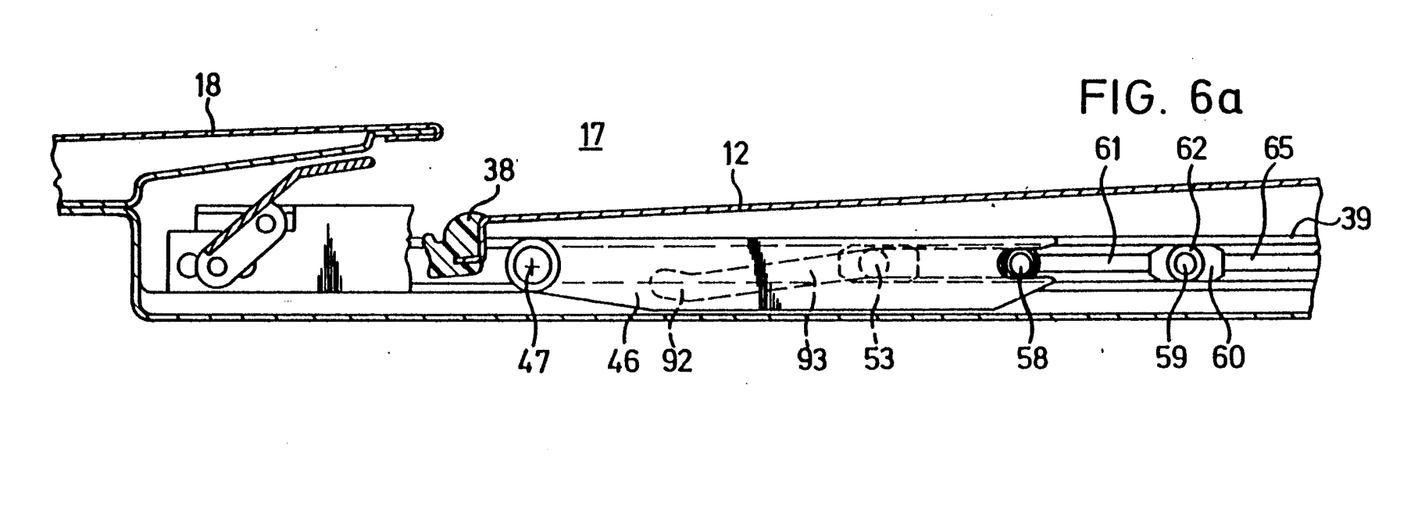
FIGS. 6a and 6b are lengthwise sectional views corresponding, respectively, to those of FIGS. 5a and 5b, but with the cover in the ventilation position of FIG. 2, FIG. 6b being taken along the line Vb—Vb of FIG. 10.
Figure 6B:
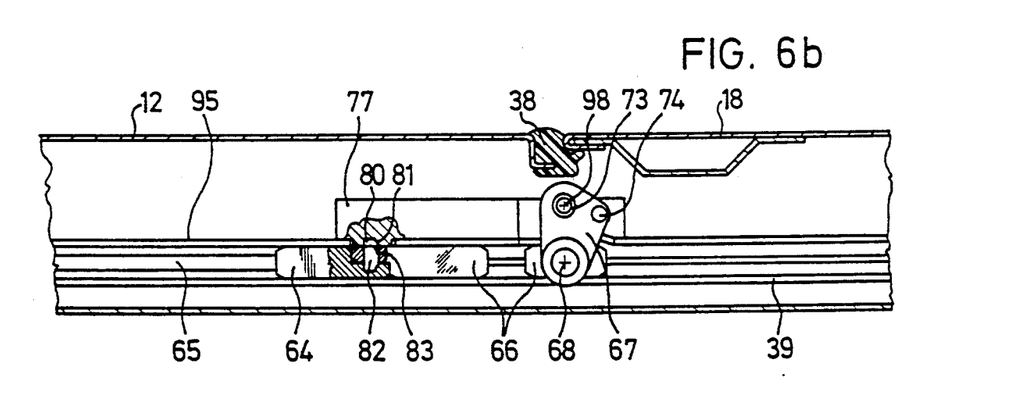
Figure 7:
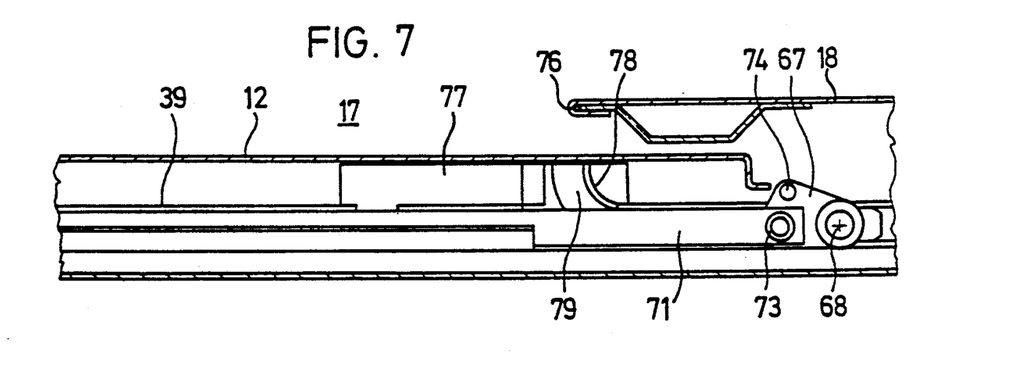
FIG. 7 is a lengthwise sectional view similar to that of FIGS. 5b and 6b, but taken along the line VII—VII of FIG. 10 and with the cover brought into a lowered sliding position and partially retracted.

When cover 12 is in its frontmost position, recess 80 receives the upper part of a locking slide 82 (FIG. 5b) that is guided to slide in a throughhole 83 of glide part 66 perpendicular to the sliding direction of this slide. A locking bar 84 is located between the underside of a tapered, front end section 85 of glide part 66 and lower wall 86 of glide track 42. Locking bar 84 can be slid, together with glide part 66, along glide track 42. Further, locking bar 84 can perform a sliding movement relative to glide part 66 that is limited by engagement of a pin 87, that projects from locking bar 84, against the front and rear surfaces of a lengthwise slot 88 of glide part 66 in which pin 87 is displaceably received (FIG. 5b). Locking bar 84 is urged forward into the position illustrated in FIG. 5b by a spring 89 that is prestressed between locking bar 84, in front, and an abutment surface 90 of glide part 66. In this position, locking bar 84 is pushed underneath locking slide 82 to keep the latter engaged in recess 80 of link 77. In unlocking bar 64 a recess 91 is formed that is upwardly open and that can receive the lower part of locking slide 82 when locking bar 84 is pushed rearward relative to glide part 66 against the force of spring 89 (FIG. 6b).

The illustrated ventilation roof operates as follows:

If cover 12, 12' is in the closed position according to FIGS. 1, 5a, 5b and 8, pivoted lever 46 is pivoted around axis 47 into the position illustrated in FIG. 5a in which the glide element 58 is grasped by fork-like guide track 57 of pivoted lever 46 and is brought upward into a position in which cover front edge 20 is almost flush with the front edge of roof opening 17. In this position, cover support 60 is pushed underneath pivot lever 46, to reliably keep pivot lever 46 in its upward-pivoted position. Simultaneously, push-out lever 67 assumes an essentially vertical position according to FIG. 5b in which bolt 72 brings cover part 71 into a position causing rear edge 19 of cover 12, 12' to lie at least substantially flush with rear edge 76 of roof opening 17. Locking slide 82, located in throughhole 83 of glide part 66, engages in recess 80 of link 77. Thus, glide part 66 and, by rods 61 and 65, also catch 54 and cover support 60, are secured against sliding movements with respect to stationary parts of the roof, such as longitudinal guide mechanism 39 and stationary roof skin 18. Locking bar 84 prevents locking slide 82 from unintentionally coming out of recess 80.

If, starting from the closed position, cover 12, 12' is brought into the ventilation position according to FIG. 2, drive cable 33 is shifted rearward by drive motor 34 or crank handle 36, thereby shifting link journal 53 rearward by catch 54 along a front section 92 of link track 52. Front section 92 runs parallel to glide track 42, and in this position of the pivoted lever, cover support 60 has been shifted rearward by catch 54 via rod 61, thereby releasing pivot lever 46. If, link journal 53 subsequently travels along rearward-rising section 93 of link track 52, pivot lever 46 is forced to make a clockwise pivoting movement, during the course of which pivot lever 46 shifts from the position illustrated in FIG. 5a into the position of FIG. 6a.

As pivot lever 46 pivots around axis 47, glide element 58 is brought down with it, and glide element 58 penetrates into glide track 42, via an opening 94 in an upper wall 95 of glide track 42. As can be seen especially from FIGS. 5a and 8, the rear end 99 of pivot lever 46 projects beyond rear edge 100 of opening 94. This prevents glide element 58, during transition from guide track 57 into glide track 42 and vice versa, from becoming disengaged as it is moves in the vertical direction. A smooth, impact-free transition is guaranteed.

Because of the pivoting movement of pivot lever 46, cover 12, 12' is swung around a horizontal pivot axis 98 (FIG. 6b), that is defined by bolt 72 of rear height adjustment devices 45 and that lies near cover rear edge 19, from the closed position of FIG. 1 into the ventilation position according to FIG. 2. The vehicle interior can, then, be effectively ventilated through gap 23. In this position the unlocking part 64 is moved into the position illustrated in FIG. 6b in which it has pushed locking bar 84 back with respect to glide part 66 against the force of spring 89 with respect to glide part 66 against the force of spring 89. Unlocking part 64 has come to lie against glide part 66 to take the latter with it further rearward. The rearward-directed force component transmitted from unlocking part 64 to locking slide 82 has caused, by interaction with the sloping rear wall 81 of recess 80, the locking slide to leave recess 80 in link 77 and, instead, to insert its lower end into recess 91 of unlocking part 64. In this way, glide part 66 is no longer restrained from moving, and is slaved by locking slide 82, to unlocking part 64 and by rods 61 and 65 and catch 54 to drive cable 33.

With further shifting of drive cable 33 to the rear, glide element 58 disengages from pivot lever 46 while being reliably guided in glide track 42, between its lower and upper walls 86, 95. Unlocking part 64 and guide part 66 move rearward together and by lying against the upper wall 95 of glide track 42, locking slide 82 is prevented from leaving recess 91 of unlocking part 64. The engagement between roller 73 and link slot 79 makes push-out lever 67 perform a counterclockwise pivoting movement (in FIGS. 5b, 6b and 7). Push-out lever 67 pivots through an angle of approximately at least 90° into the position illustrated in FIG. 7. In this way, cover 12, 12' is lowered in the area of its rear edge 19 (FIGS. 3 and 7), and roller 73 goes from link slot 79 into glide track 42. In the course of this movement, cover 12, 12' is swung around the glide element 58 that is guided in glide track 42 and is offset rearward relative to cover front edge 20. Consequently, the front edge of cover 12, 12' is raised back by a certain amount, as indicated in FIG. 3. Cover 12, 12' can now be pushed rearward parallel to fixed roof skin 18 (FIG. 4), and elements joined to the cover, namely glide element 58 and bolt 72 with roller 73, are guided, in the front and rear cover areas, respectively, in glide track 42.

If the drive direction of drive cable 33 is reversed, then, because of the still-existing coupling between locking bar part 64 and glide part 66, cover 12, 12' is pulled forward until roller 74 strikes cam track 78 of link 77. With further forward movement of glide part 66, push-out lever 67 is made to perform a clockwise pivoting movement (in FIG. 7) by the interaction of roller 74 and cam track 78. As a result, roller 73 exits glide track 42 and goes into link slot 79, and the rear of cover 12 is pushed upward (FIGS. 2 and 6b). When unlocking part 64 and glide part 66, again, reach the position illustrated in FIG. 6b, locking slide 82 is aligned with recess 80 of link 77. At this point, a forward-directed force component exerted by locking bar part 64 on locking slide 82 will cause the locking slide to move upward relative to glide part 66, above the inclined, rear delimiting wall 96 of recess 91. In this way, locking slide 82 is released from unlocking part 64 and glide part 66 is again stopped with respect to link 77. In this way, the coupling between the drive and glide part 66 is terminated.

With further forward movement of unlocking part 64, it disengages from locking bar 84. Under the influence of spring 89, locking bar 84, then, comes to lie underneath locking slide 82 (FIG. 5b) to prevent an unintentional releasing of the glide part 66. Link journal 53 enters link track 52 and moves, first, along its rear section 97, which runs parallel to glide track 42 in the pivoted position of pivot lever 46 illustrated in FIG. 6a. Once link journal 53 reaches central link track section 93, glide element 58 of the cover 12, 12' enters guide track 57 of pivot lever 46. Further forward movement of catch 54 causes pivot lever 46 to pivot, because of the mutual engagement of link journal 53 and section 93 of link track 52, in counterclockwise direction around axis 47 (FIGS. 5a and 6a). Cover 12, 12' is raised in front, and swings around axis 98. Cover support 60 is pushed underneath pivot lever 46, as the cover, again, reaches its closed position (FIGS. 1, 5a and 5b).

Figure 11:
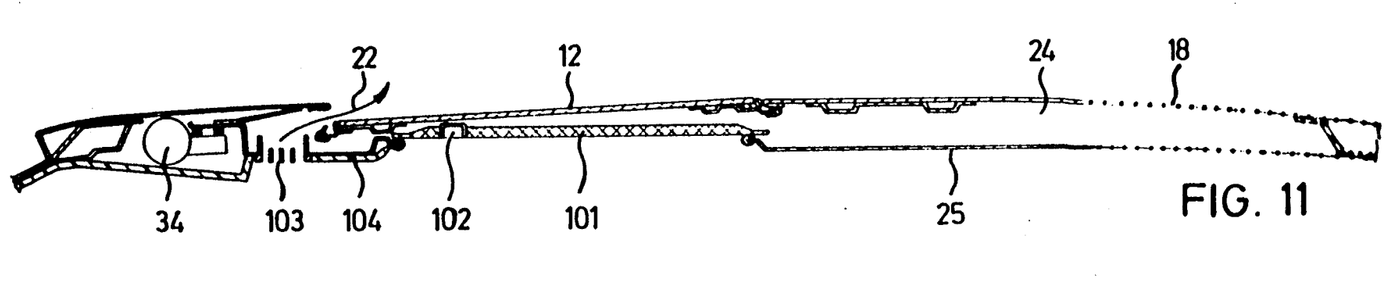
FIGS. 11 and 12 are lengthwise sections through a ventilation roof with an additional sliding inside roof lining.
Figure 12:
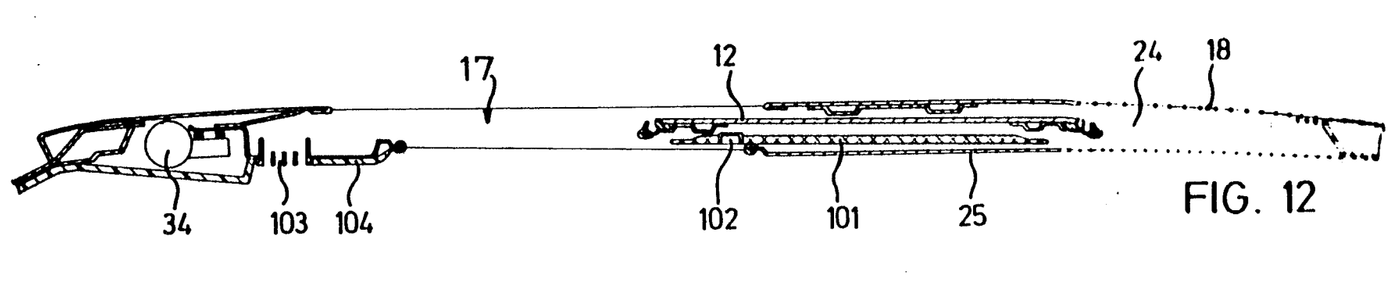

In the above-described embodiments, cover 12, 12' is represented as an opaque sheet metal cover. However, it should be understood that the cover can be made, in a known way, of translucent or transparent material, in particular glass. With such a glass cover 12", as illustrated in FIGS. 11 and 12, usually a sliding inside roof headliner 101 is disposed underneath the cover that can alternately be pushed, for example, by hand via a recessed grip 102, when the cover is in the closed or ventilation position, between a closed position (FIG. 11) and an open position (FIG. 12). In this way, light reaching the vehicle interior can be influenced as desired. To make possible the formation air stream 22 in the ventilation position of cover 12", even when sliding inside roof lining 101 is in the closed position, in the embodiment according to FIGS. 11 and 12, a ventilation screen 103 is provided in a part of a stationary inside roof lining 104 which engages under the front edge of roof opening 17.

In the modified embodiments according to FIGS. 13 to 17, on the other hand, a catch device, designated overall by 106, is present that makes sure that sliding inside roof headliner 101, is automatically pushed rearward a predetermined distance from its closed position when cover 12" is swung from the closed cover position into the ventilation position. Catch device 106 comprises, on each side of the roof, a catch 107 connected to drive 32 and a counterpart 108 located on the top side of sliding inside roof headliner 101. In the embodiment illustrated in FIGS. 13 to 15, catch 107 is integrated into unlocking part 64 which is in permanent drive connection with associated drive cable 33, rod 65, cover support 60 with bolts 59, glide element 58 and link journal 53. Catch 107 can also be coupled to drive cable 33 in another way.

Figure 13:
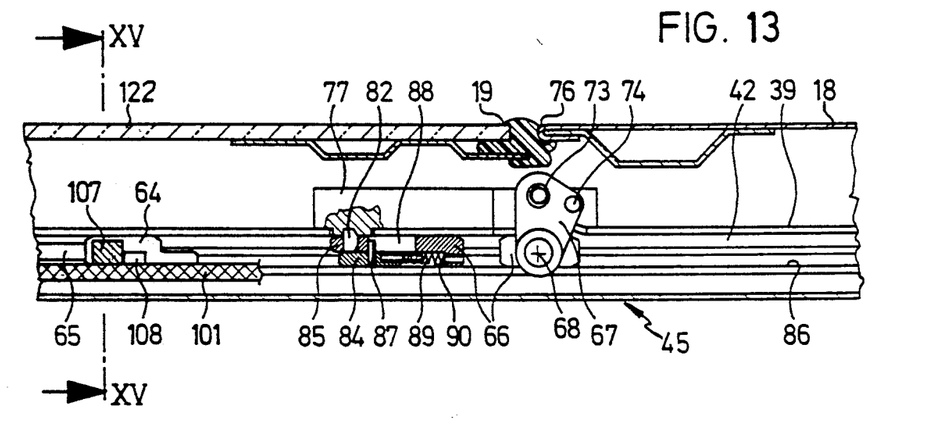
FIGS. 13 and 14 are partial lengthwise sections corresponding to FIGS. 5b and 6b for a modified embodiment of the ventilation roof with an automatically adjustable sliding inside roof lining.
Figure 14:
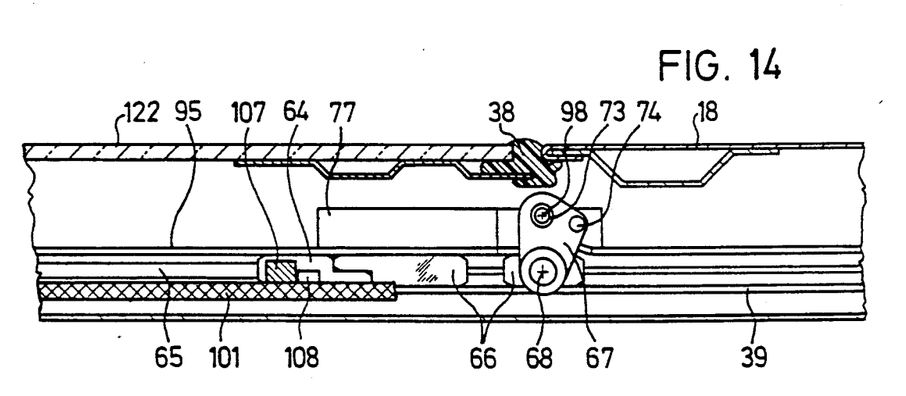
Figure 15:
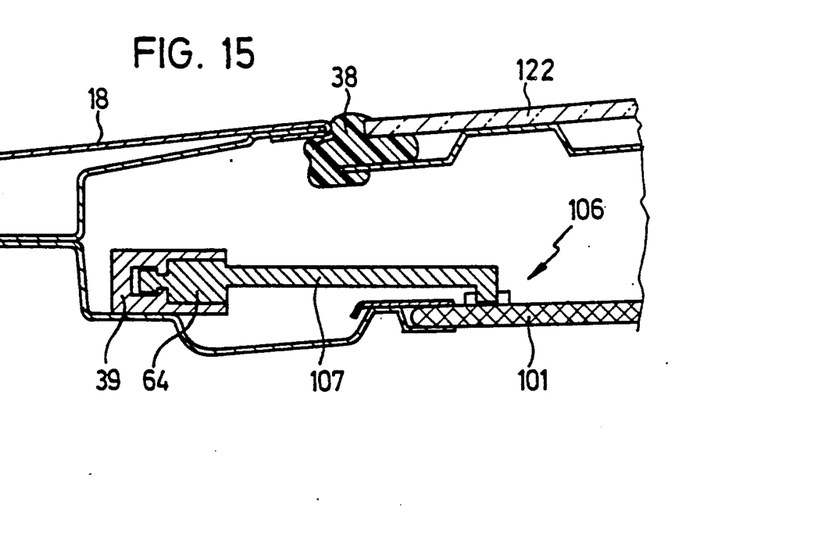
FIG. 15 is the section along line XV—XV of FIG. 13.

In the position illustrated in FIG. 13, cover 122 is in its closed position, and sliding inside roof lining 111 is also pushed into its closed position, completely forward. Catch 107 and counterpart 108 here are in mutual contact. If now cover 12 is lowered in front into the ventilation position, unlocking part 64 shifts rearward into the position according to FIG. 14. As a result, catch 107 pushes sliding inside roof headliner 101, via counterpart 108, a certain distance rearward. In this way, a ventilation gap 109 is opened between front edge 110 of sliding inside roof headliner 101 and an opening edge 111 of a stationary cover lining 112, through which air stream 22 can enter. If desired, sliding inside roof headliner 101 can also be moved further rearward by hand from the position according to FIG. 16.

Figure 16:
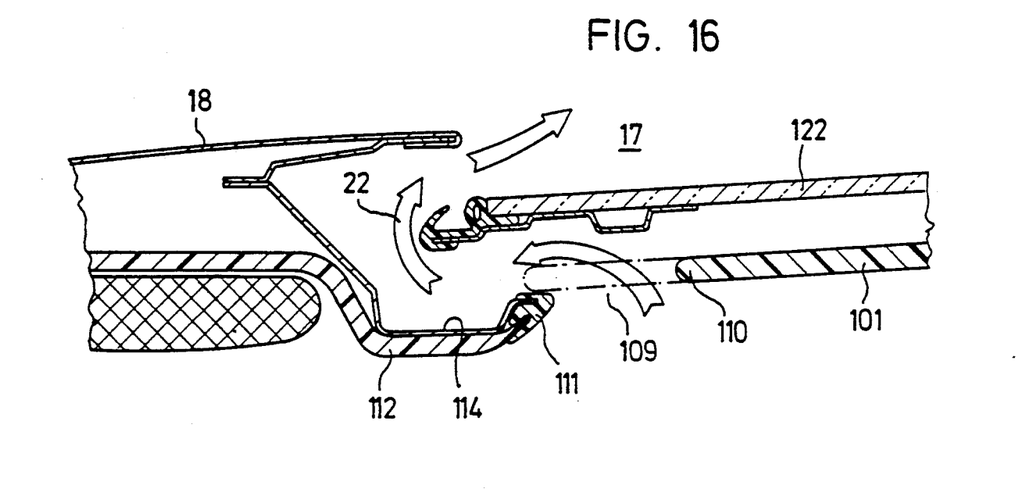
FIGS. 16 and 17 are partial lengthwise sections for the front ventilation roof area that show two different embodiments in this area.

In the embodiment according to FIG. 16, underneath the front edge of roof opening 17 there is provided a stationary drip molding 114. With such an arrangement, drip molding 13 on the cover as shown, can be eliminated at least in this area.

Figure 17:
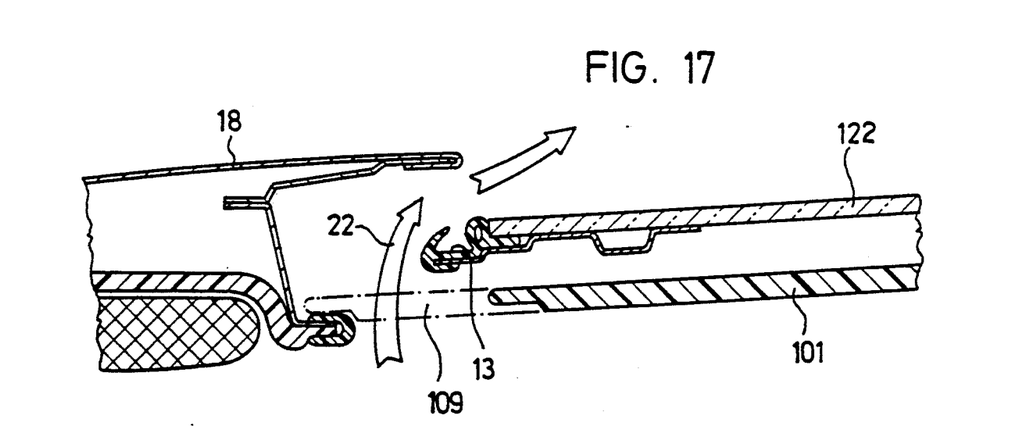

FIG. 17 shows, on the other hand, a variant without stationary drip molding 114. In this case, the drip molding 13 carried by the cover 122 catches water drops flowing forwardly off the cover and diverts them to the side. The air gap opened automatically upon swinging cover 122 into the ventilation position is, again, indicated at 109.

Optionally, catch 107 can also be constantly connected to sliding inside roof lining 101 by an elastic intermediate part to force accompanying sliding movements of the cover. Such an embodiment is suited especially for covers of opaque material, i.e., sheet metal covers above all.

Compared to the roof according to FIGS. 11 and 12, with the arrangement according to FIGS. 13 to 17, the interior of the vehicle maintains the usual appearance associated with conventional sliding-lifting roofs. By eliminating ventilation screen 103, a quieter ventilating air flow is obtainable. With the automatic adjustment of the sliding inside roof headliner in accordance with the invention hardly any additional expenses result because of ingenious exploitation of the mechanism that is necessary, anyway, for obtaining the cover adjustment.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. In a ventilation roof for vehicles with a roof opening made in a fixed roof skin that can be closed by a cover that is actively connected on both sides to an adjustment mechanism having front and rear height adjustment devices, the cover being swingable by the front height adjustment devices, starting from a closed position, around a pivot axis lying near a rear edge of the cover, into a ventilation position in which a front edge of the cover lies at a distance below a plane at the height of the roof skin, while the cover rear edge is kept approximately at the height of the fixed roof skin, and where the rear edge of the cover can then be lowered, so that the cover can be slid to the rear by a drive along longitudinal guide mechanism that are fixed with the roof, approximately parallel to the fixed roof skin, underneath the roof skin, into an open position in which the cover at least partially opens the roof opening, the improvement wherein each front height adjustment device has a positionally adjustable pivot lever that is supported, in a front end area, for rotation around a stationary axis that runs crosswise to the cover sliding direction, and is approximately horizontal, and wherein the cover is connected to the pivot lever at said stationary axis by a detachable coupling which is connected only when the cover is slid fully forward.

2. Ventilation roof according to claim 1, wherein said detachable coupling comprises guide elements that are attached to the cover and are placed near the front and rear edges of said cover, said guide elements being adjustable in height between a position lying above the longitudinal guide mechanisms and a lowered position in vertical alignment with the longitudinal guide mechanisms, said guide elements being slidable along the lengthwise guide mechanism in said lowered position.

3. Ventilation roof according to claim 2, wherein said pivot lever is provided with a rearwardly open guide track; wherein the guide element attached to the cover near its front edge detachably engages in said guide track, when the cover is slid fully forward, to form said detachable coupling of the pivot lever with the cover.

4. Ventilation roof according to claim 1, wherein said pivot lever is provided with a rearwardly open guide track; wherein a glide element is connected to the cover at least near the front edge of the cover, said glide element detachably engaging in said guide track, when the cover is slid fully forward, to form said detachable coupling of the pivot lever with the cover.

5. Ventilation roof according to claim 4, wherein the guide track of the pivot lever has ar open end, and the longitudinal guide mechanism has a glide track, the open end of the pivot lever assuming a position, when the front edge of the cover is lowered, in which it is aligned with the glide track of the lengthwise guide mechanism as a means for enabling the glide element to move from the guide track into the glide track.

6. Ventilation roof according to claim 4, wherein an actuation element that is permanently connected to the drive is provided as a means for positively adjusting the position of the pivot lever.

7. Ventilation roof according to claim 6, wherein a link track is provided in the pivot lever; and wherein said actuation element comprises a link journal which engages in said link track as a means for forcing the pivot lever to pivot around a stationary axis.

8. Ventilation roof according to claim 7, wherein the link track merges into said guide track at a rear end, said guide track being open in a rearward direction for enabling the link journal to move from the pivot lever, along the longitudinal guide mechanism when the cover is slid to the rear.

9. Ventilation roof according to claim 1, wherein support elements are connected to the-drive as a means for bracing the pivot lever against pivoting in the closed position of the cover.

10. Ventilation roof according to claim 1, wherein a locking device is provided as a means for locking the cover against longitudinal displacement in the closed position and during pivoting movements of the cover between the closed position and the ventilation position.

11. Ventilation roof according to claim 1, wherein each rear height adjustment device comprises a push-out lever which, at one end, is linked to the cover and, on at an opposite end, is linked to a glide part that is guided to slide along a respective one of said longitudinal guide mechanisms.

12. Ventilation roof according to claim 11, wherein the push-out lever assumes an at least approximately vertical position as long as the cover is slid fully forward.

13. Ventilation roof according to claim 11, wherein push-out lever is mounted so as to pivot through an angle of at least approximately 90° to lower the rear edge of the cover.

14. Ventilation roof according to claim 11, wherein guide elements are attached to the cover and are placed near the front and rear edge of cover, said guide elements being adjustable in height between a position lying above the longitudinal guide mechanisms and a lowered position in vertical alignment with the longitudinal guide mechanisms, and being slidable along the lengthwise guide mechanisms in said lowered position; and wherein the push-out lever is connected to the cover by a bolt, which forms part of the guide element, near the rear edge of the cover, that engages in the longitudinal guide mechanism during cover sliding movements.

15. Ventilation roof according to claim 11, wherein the push-out lever carries a catch which, during forward movement of the cover, lies against a cam track that is fixed with a stationary part of the roof and comprises a means for forcing the push-out lever to make a pushing-out movement.

16. Ventilation roof according to claim 11, wherein a second detachable coupling is provided as a means for automatically coupling the drive with the glide part for swinging the push-out lever and for sliding the cover.

17. Ventilation roof according to claim 16, wherein a locking device is provided as a means for locking the cover against longitudinal displacement in the closed position and during pivoting movements of the cover between the closed position and the ventilation position; wherein the second detachable coupling and the locking device interact with one another so that, upon engagement of the coupling, the locking device is forced to become unlocked and, when the locking device is locked, the coupling is forced to become disengaged.

18. Ventilation roof according to claim 17, wherein the second detachable coupling and the locking device have a common locking bar block in permanent connection with the glide part, a locking slide, under the influence of the drive, bringing the glide part, alternately, into detachable, positively locking connection with a drive element that is permanently connected to the drive and slidable along the lengthwise guide mechanism and with a part that is fixed relative to the roof skin.

19. Ventilation roof according to claim 1, wherein the adjustment mechanism and lengthwise guide mechanisms are placed on each side of the roof opening and cover below the roof skin.

20. Ventilation roof according to claim 1, wherein, when moving the cover from the ventilation position into the open position, the front edge of the cover is raised to a height that lies between the height of the front edge of the cover in the ventilation position and its height in the closed position.

21. Ventilation roof according to claim 1, wherein a sliding inside roof headliner that is coupled by a catch device to the drive, so that the sliding inside roof headliner, in its closed position, is automatically pushed back during swinging of the cover from the closed position into the ventilation position, as a means for creating a ventilation gap in front of the sliding inside roof headliner.

22. Ventilation roof according to claim 21, wherein said drive comprises drive cables and components fixedly connected with the drive cable, and wherein the catch device comprises a catch that is driven by the cable.

23. Ventilation roof according to claim 22, wherein a detachable coupling is provided as a means for automatically coupling the drive with the glide part for swinging the push-out lever and for sliding the cover, and wherein the catch is connected to a part of the detachable coupling, said part of the detachable coupling being fixed to the drive cable.

24. In a ventilation roof for a vehicle with a roof opening made in a fixed roof skin that can be closed by a cover that is actively connected on both sides to an adjustment mechanism having front and rear height adjustment devices, the cover being swingable by the front height adjustment devices, starting from a closed position, around a pivot axis lying near a rear edge of the cover, into a ventilation position in which a front edge of the cover lies at a distance below a plane at the height of the roof skin, while the cover rear edge is kept approximately at the height of the fixed roof skin, and where the rear edge of the cover can then be lowered, so that the cover can be slid to the rear by a drive along longitudinal guide mechanisms that are fixed with the roof, approximately parallel to the fixed roof skin, underneath the roof skin, into an open position in which the cover at least partially opens the roof opening, the improvement wherein a sliding inside roof headliner is coupled by a catch device to the drive via a detachable coupling, so that the sliding inside roof headliner, in its closed position, is automatically pushed back during swinging of the cover from the closed position into the ventilation position, as a means for creating a ventilation gap in front of the sliding inside roof headliner; wherein said drive comprises drive cables and components fixedly connected with the drive cables, and wherein the catch device comprises a catch that is driven by a respective one of the cables; wherein said detachable coupling is provided as a means for automatically coupling the drive with a glide part for swinging a push-out lever and for sliding the cover, and wherein the catch is connected to a part of the detachable coupling, said part of the detachable coupling being fixed to the drive cable.

* * * * *